US012804632B2

(12) United States Patent
Hsu et al.

(10) Patent No.: US 12,804,632 B2
(45) Date of Patent: Nov. 17, 2026

(54) COMMUNICATION DEVICE AND TRANSMISSION METHOD

(71) Applicant: Realtek Semiconductor Corp., HsinChu (TW)

(72) Inventors: Chia-Yu Hsu, HsinChu (TW); Wen-Yung Lee, HsinChu (TW); Jhe-Yi Lin, HsinChu (TW); Yun-Tai Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 275 days.

(21) Appl. No.: 18/735,206

(22) Filed: Jun. 6, 2024

(65) Prior Publication Data

US 2024/0422765 A1 Dec. 19, 2024

(30) Foreign Application Priority Data

Jun. 13, 2023 (TW) ................................ 112121952

(51) Int. Cl.
*H04W 72/12* (2023.01)
*H04W 74/0808* (2024.01)

(52) U.S. Cl.
CPC ....... *H04W 72/12* (2013.01); *H04W 74/0808* (2013.01)

(58) Field of Classification Search
CPC .......................... H04W 72/12; H04W 74/0808
See application file for complete search history.

(56) References Cited

U.S. PATENT DOCUMENTS

2012/0127981 A1* 5/2012 Verma .................. H04W 74/08 370/338
2018/0007689 A1* 1/2018 Patil ........................ H04L 69/22
2018/0084554 A1* 3/2018 Chu ....................... H04L 1/1628
2018/0098352 A1* 4/2018 Kim ...................... H04W 74/04
2019/0274171 A1* 9/2019 Viger ................ H04W 28/0268
2020/0077273 A1* 3/2020 Cherian ................ H04W 16/02
(Continued)

FOREIGN PATENT DOCUMENTS

TW 201713086 A 4/2017
TW 201924375 A 6/2019

OTHER PUBLICATIONS

Krotov et al., Rate control with spatial reuse for wi-fi 6 dense deployments, pp. 168898-p. 168909, IEEE., Aug. 2020.

*Primary Examiner* — Harry H Kim
(74) *Attorney, Agent, or Firm* — Winston Hsu

(57) ABSTRACT

A transmission method for increasing a transmission throughput of a communication device includes: receiving a wireless signal, wherein the wireless signal includes a received packet; determining whether the received packet is from an overlapping basic service set (OBSS), and determining a length of a duration of a transmission opportunity (TXOP) according to information carried by the received packet; in response to the received packet being from the OBSS, performing packet transmission in a spatial reuse manner within the duration of the TXOP; and performing the packet transmission in a general manner after the duration of the TXOP ends; wherein a transmission power utilized in the spatial reuse manner is different from a transmission power utilized in the general manner, and a plurality of packets are transmitted in the spatial reuse manner within the duration of the TXOP.

17 Claims, 7 Drawing Sheets

(56) References Cited

U.S. PATENT DOCUMENTS

| | | | | |
|---|---|---|---|---|
| 2021/0022135 | A1* | 1/2021 | Peng | H04W 72/12 |
| 2022/0104143 | A1* | 3/2022 | Chang | H04W 28/10 |
| 2022/0116955 | A1* | 4/2022 | Naribole | H04W 72/12 |
| 2022/0338261 | A1* | 10/2022 | Nunome | H04W 74/0816 |
| 2023/0088296 | A1* | 3/2023 | Hedayat | H04W 72/0473<br>370/329 |
| 2025/0202559 | A1* | 6/2025 | Kwon | H04B 7/0626 |
| 2026/0025848 | A1* | 1/2026 | Wu | H04W 74/0808 |

* cited by examiner

COMMUNICATION DEVICE AND TRANSMISSION METHOD

BACKGROUND OF THE INVENTION

1. Field of the Invention

The present invention is related to a spatial reuse transmission method, and more particularly, to a transmission method that increases transmission throughput based on spatial reuse transmission.

2. Description of the Prior Art

Basic service sets (BSSs) of multiple Wi-Fi devices may exist simultaneously in the same space, necessitating Wi-Fi devices within an overlapping BSS (OBSS) to utilize a carrier sense multiple access/collision avoidance (CSMA/CD) mechanism. This mechanism means it is difficult for the Wi-Fi devices to find an idle source (e.g., an idle time) in which to perform transmission, and greatly reduces transmission performance of the Wi-Fi devices.

In order to address this issue, a transmission method that can effectively increase transmission throughput and a communication device for performing the transmission method are urgently needed.

SUMMARY OF THE INVENTION

According to an embodiment of the present invention, a communication device is provided. The communication device comprises a wireless transceiver circuit and a baseband signal processing circuit. The wireless transceiver circuit is arranged to transmit and receive a wireless signal, wherein the wireless signal comprises a received packet. The baseband signal processing circuit is coupled to the wireless transceiver circuit, and is arranged to process the received packet. The baseband signal processing circuit comprises a decision unit and a transmit packet scheduling unit. The decision unit is arranged to determine whether the received packet is from an OBSS, and determine a length of a duration of a transmission opportunity (TXOP) according to information carried by the received packet. The transmit packet scheduling unit is arranged to schedule transmission of a plurality of packets. When the decision unit determines that the received packet is from the OBSS, the transmit packet scheduling unit arranges to transmit a first packet among the plurality of packets, and further determines whether the duration of the TXOP has not ended after transmission of the first packet is completed. In response to the transmit packet scheduling unit determining that the duration of the TXOP has not ended, the packet transmission scheduling unit arranges to transmit a second packet among the plurality of packets within the duration of the TXOP.

According to another embodiment of the present invention, a communication device is provided. The communication device comprises a wireless transceiver circuit and a baseband signal processing circuit. The wireless transceiver circuit is arranged to transmit and receive a wireless signal, wherein the wireless signal comprises a received packet. The baseband signal processing circuit is coupled to the wireless transceiver circuit, and is arranged to process the received packet, determine whether the received packet is from an OBSS, and determine a length of a duration of a TXOP according to information carried by the received packet. When the received packet is from the OBSS, the baseband signal processing circuit performs packet transmission in a spatial reuse manner within the duration of the TXOP, and performs the packet transmission in a general manner after the duration of the TXOP ends. In addition, a transmission power utilized in the spatial reuse manner is different from a transmission power utilized in the general manner, and the baseband signal processing circuit transmits a plurality of packets in the spatial reuse manner within the duration of the TXOP.

According to another embodiment of the present invention, a transmission method for increasing a transmission throughput of a communication device is provided. The transmission method comprises: receiving a wireless signal, wherein the wireless signal comprises a received packet; determining whether the received packet is from an OBSS, and determining a length of a duration of a TXOP according to information carried by the received packet; in response to the received packet being from the OBSS, performing packet transmission in a spatial reuse manner within the duration of the TXOP; and performing the packet transmission in a general manner after the duration of the TXOP ends; wherein a transmission power utilized in the spatial reuse manner is different from a transmission power utilized in the general manner, and a plurality of packets are transmitted in the spatial reuse manner within the duration of the TXOP.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
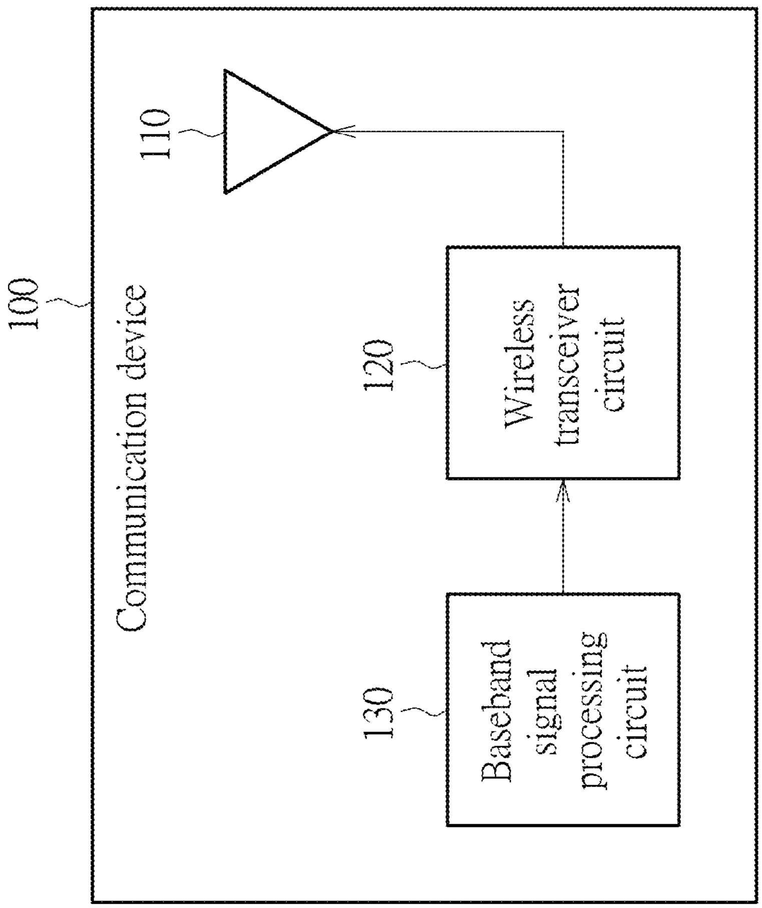
FIG. 1 is a block diagram of a communication device according to an embodiment of the present invention.

FIG. 1 is a block diagram of a communication device 100 according to an embodiment of the present invention, wherein the communication device 100 may include at least one antenna 110, a wireless transceiver circuit 120, and a baseband signal processing circuit 130. It should be noted that FIG. 1 is a simplified communication device and only illustrates components related to the present invention. In practice, a communication device may further include components that are not shown in FIG. 1 and can implement wireless communication and associated signal processing.

The wireless transceiver circuit 120 is arranged to receive wireless signals through the at least one antenna 110, process received wireless signals and/or signals to be transmitted, and transmit corresponding wireless signals through the at least one antenna 110. For example, the wireless transceiver circuit 120 may perform power amplification/attenuation processing and up-frequency/down-frequency conversion upon signals, to convert baseband signals into radio frequency (RF) signals, or to convert the RF signals into the baseband signals. The baseband signal processing circuit 130 is arranged to process the baseband signals and control operations of the communication device 100 (e.g., establishment of a connection between the communication device 100 and another communication device, and various operations, determination, signal generation, signal processing, and signal transmission during the wireless communication).

The communication device 100 may operate according to communication protocols specified by the 802.11 standard, and may be a device supporting a spatial reuse function. In embodiments of the present invention, the communication device 100 may be arranged to implement an access point (AP) within a basic service set (BSS), and may also be arranged to implement a station accessing a network through the AP within the BSS.

In the wireless communication standard 802.11ax, a spatial reuse (SR) mechanism is specified, which makes a communication device simultaneously perform transmission within a transmission opportunity (TXOP) of other communication devices by adjusting a transmission power, for increasing a usage rate of a spectrum. The 802.11 standard only illustrates transmission regulations for transmitting a packet within the TXOP of an OBSS, however. As a result, after a communication device completes transmission of a packet within the TXOP of other communication devices, the wireless communication standard does not specify how to perform transmission during the remaining time, which may waste a lot of time and opportunities for transmitting packets even if the SR mechanism specified by the wireless communication standard is applied. More particularly, the longer the duration of the TXOP of the OBSS, the more serious the negative impact will be on the throughput, which causes delays that will affect the user experience.

In order to address this issue, the present invention proposes a transmission method that can effectively increase the transmission throughput and reduce the delay, and a communication device performing the transmission method. The transmission method can be regarded as a method which modifies the existing SR mechanism.

Figure 2:
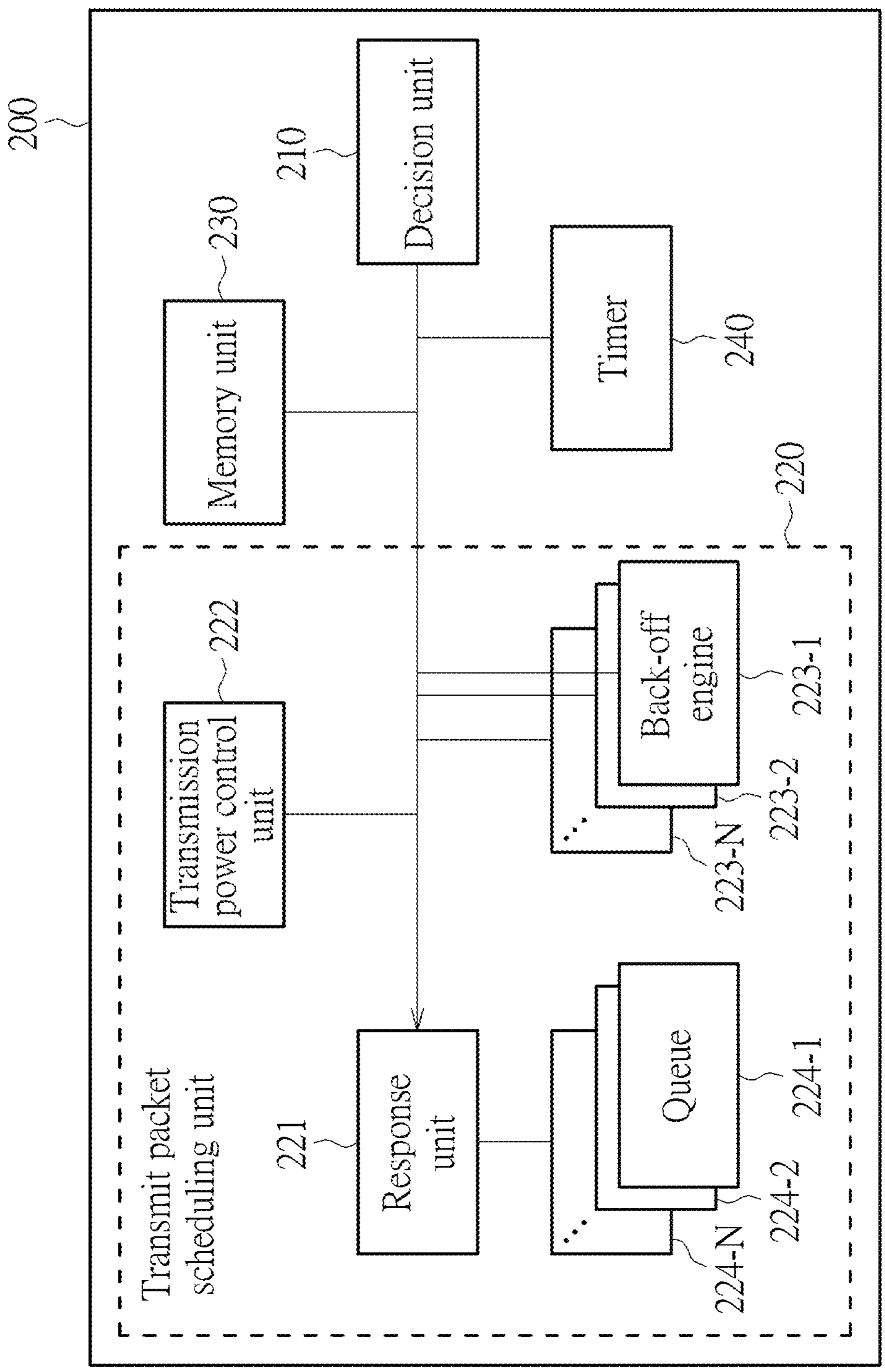
FIG. 2 is a block diagram of a baseband signal processing circuit according to an embodiment of the present invention.

FIG. 2 is a block diagram of a baseband signal processing circuit 200 according to an embodiment of the present invention. The baseband signal processing circuit 200 may include a decision unit 210, a transmit packet scheduling unit 220, a memory unit 230, and a timer 240. In an embodiment of the present invention, a wireless signal received by the wireless transceiver circuit 120 can be converted from an RF signal to a baseband signal, and the baseband signal may include a received packet. The baseband signal processing circuit 200 may process the received packet, and the decision unit 210 may determine whether the received packet is from an overlapping basic service set (OBSS). For example, in an embodiment of the present invention, the decision unit 210 may determine whether the received packet is from the OBSS according to contents of a BSS color field in the received packet. If the BSS color set in the received packet is different from the BSS color to which the communication device 100 currently belongs, it is determined that the received packet is from the OBSS. If the BSS color set in the received packet is the same as the BSS color to which the communication device 100 currently belongs, it is determined that the received packet is not from the OBSS but from the BSS color to which the communication device 100 belongs.

In an embodiment of the present invention, when the received packet is determined to be from the OBSS, the decision unit 210 within the baseband signal processing circuit 130/200 may determine to perform packet transmission in a spatial reuse manner within a duration of a TXOP corresponding to the received packet. When the received packet is determined to not be from the OBSS but the BSS color to which the communication device 100 belongs, the decision unit 210 within the baseband signal processing circuit 130/200 may stop performing the packet transmission to avoid packet collision or interference.

Specifically, in an embodiment of the present invention, the decision unit 210 may determine a length of a duration of a TXOP according to information carried by the received packet, and set the timer 240 according to the length, so that the timer 240 counts for a period of time equal to the length. When the timer 240 expires, a notifying signal may be transmitted to the decision unit 210, or the decision unit 210 may periodically query to confirm whether the timer 240 has expired.

According to an embodiment of the present invention, the decision unit 210 may calculate how much transmission time the entire OBSS packet will take according to a length field in a physical layer convergence protocol (PLCP) header of the packet. The decision unit 210 may refer to a duration field in a media access control (MAC) header of the packet, and know how long after the end of the packet will another packet be transmitted by a value carried in the duration field. The decision unit 210 may determine the length of the duration of the TXOP corresponding to the packet according to the length field and the duration field, so that a length of time in which there will be OBSS packets in the channel can be known.

In addition, in an embodiment of the present invention, when the received packet is determined to be from the OBSS, the decision unit 210 may set a value of a parameter SR Period stored in the memory unit 230 as a first value, wherein the memory unit 230 may be a memory space with a length of 1 bit. In embodiments of the present invention, the parameter SR Period stored in the memory unit 230 may indicate a state of a spatial reuse duration, or may indicate whether it is currently within the duration of the TXOP corresponding to the packet. For example, when the value of the parameter SR Period is set as 1, it means that it is currently in the spatial reuse duration or is currently within the duration of the TXOP corresponding to the packet. When the timer 240 expires, the decision unit 210 may change the value of the parameter SR Period stored in the memory unit 230. For example, the value of the parameter SR Period may be set as a second value different from the first value, to represent that it is not currently in the spatial reuse duration or is not currently within the duration of the TXOP corresponding to the packet.

In embodiments of the present invention, the transmit packet scheduling unit 220 may determine whether the duration of the TXOP corresponding to the packet ends according to the value of the parameter SR Period, and perform the packet transmission in the spatial reuse manner before the duration of the TXOP corresponding to the packet ends.

Figure 3:
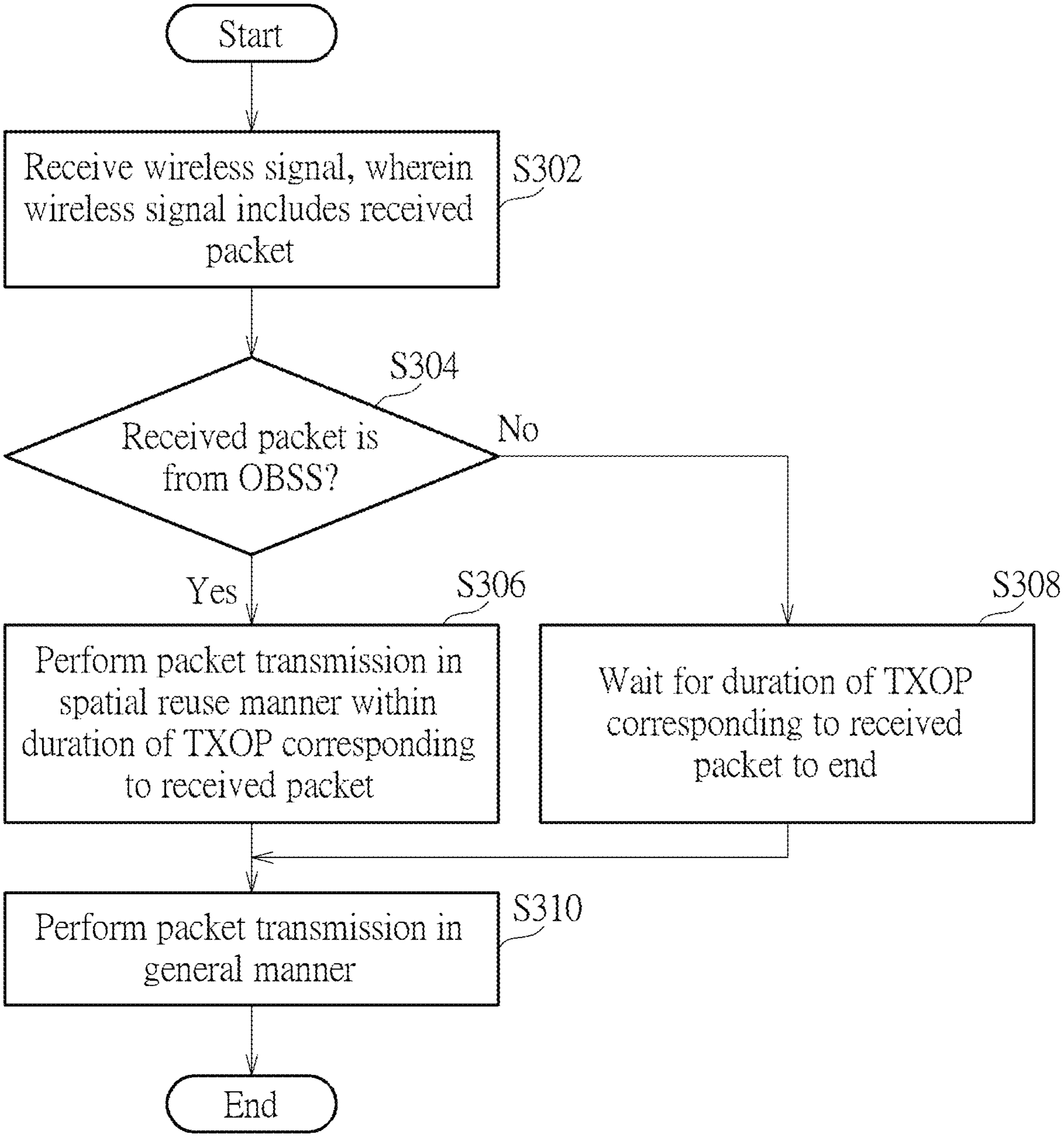
FIG. 3 is a flow chart of a transmission method according to an embodiment of the present invention.

FIG. 3 is a flow chart of a transmission method according to an embodiment of the present invention. The transmission throughput of the communication device 100 may be increased by performing the transmission method, and the transmission method may include the following steps executed by the communication device 100.

In Step S302, a wireless signal is received, wherein the wireless signal includes a received packet.

In Step S304, it is determined whether the received packet is from an OBSS, and a length of a duration of a TXOP is determined according to information carried by the received packet. When the received packet is determined to be from the OBSS, Step S306 is entered. When the received packet is determined to not be from the OBSS, Step S308 is entered.

In Step S306, the packet transmission is performed in a spatial reuse manner within the duration of the TXOP corresponding to the received packet. In embodiments of the present invention, before the duration of the TXOP corresponding to the received packet ends, the communication device 100 may stay in Step S306 to perform multiple instances of packet transmission in the spatial reuse manner. For example, the baseband signal processing circuit 130 may transmit multiple packets in the spatial reuse manner within the duration of the TXOP corresponding to the received packet. After determining that the duration of the TXOP corresponding to the received packet ends, the baseband signal processing circuit 130 may stop performing the packet transmission in the spatial reuse manner.

In Step S308, the communication device 100 waits for the duration of the TXOP corresponding to the received packet to end.

In Step S310, the packet transmission is performed by a normal method.

In embodiments of the present invention, a transmission power utilized in the spatial reuse manner is different from that utilized in the general manner. For example, in order to avoid affecting the packet transmission of the OBSS, the transmission power utilized in the spatial reuse manner may be lower than that utilized in the general manner.

Refer back to FIG. 2. The packet transmission in Step S306 is further described as follows.

In embodiments of the present invention, the transmit packet scheduling unit 220 is arranged to schedule the transmission of multiple packets. When the decision unit 210 determines that the received packet is from an OBSS, the transmit packet scheduling unit 220 may arrange to transmit a first packet within the duration of the TXOP, and determine whether the duration of the TXOP corresponding to the received packet has not ended according to the value of the parameter SR Period after the transmission of the first packet is completed. When determining that the duration of the TXOP corresponding to the received packet has not ended, the transmit packet scheduling unit 220 may continue to arrange to transmit a second packet within the duration of the TXOP corresponding to the received packet.

Specifically, the transmit packet scheduling unit 220 may include a response unit 221, a transmission power control unit 221, a plurality of back-off engines 223-1, 223-2, . . . , and 223-N, and a plurality of queues 224-1, 224-2, . . . , and 224-N. The response unit 221 is arranged to determine whether it is still within the duration of the TXOP corresponding to the received packet (e.g., determine whether the duration of the TXOP has not ended) according to the value of the parameter SR Period, and arrange the transmission of the packets according to a selected s competitive mechanism. The transmission power control unit 222 is arranged to set a transmission power and a rate currently used by the packets according to a current transmission method (e.g., the spatial reuse manner or the general manner). Each queue is arranged to temporarily store a portion of the packets to be transmitted, and has a corresponding priority. Each back-off engine corresponds to a queue, and is arranged to count a random back-off time for a corresponding queue.

A quality of service (QOS) mechanism is specified in the 802.11 standard, which transmits the packets to four queues with different priorities according to packets' importance. For example, "N" may be a positive integer greater than or equal to 4, and the queues 224-1-224-N may at least include queues corresponding to 4 access categories AC_VO, AC_VI, AC_BE, and AC_BK in descending order of priority, respectively, wherein "AC" is the abbreviation of access category, "VO" represents the voice, "VI" represents the video, "BE" represents the best effort, and "BK" represents the background.

As mentioned above, each queue corresponds to a back-off engine. When it is determined to perform the packet transmission, each of the back-off engines 223-1-223-N may start to count a corresponding random back-off time, and during this process, keep detecting whether any packet is transmitted in the channel. If a packet is detected to be transmitted, the back-off engine may temporarily stop the count operation until the transmission of the packet is completed and the channel is confirmed to be in an idle state. The engine-off engines 223-1-223-N may keep counting the corresponding random back-off times until one of the engine-off engines 223-1-223-N first completes the counting operation, wherein the engine-off engine that first completes the counting operation competes for the opportunity to transmit the packet.

As mentioned above, when the response unit 221 determines that the duration of the TXOP has not ended, the response unit 221 may determine to arrange the transmission of the packets (e.g., the first packet and the second packet) in the spatial reuse manner according to a selected competitive mechanism. In embodiments of the present invention, optional competition mechanisms include a first competition mechanism and a second competition mechanism. According to an embodiment of the present invention, when the competition mechanism is the first competition mechanism, the back-off engines 223-1-223-N may count a corresponding random back-off time in response to each packet transmission determined to be performed within the duration of the TXOP corresponding to the received packet (i.e., the packet determined to be from the OBSS, which hereinafter is referred to as OBSS-TXOP). When the competition mechanism is the second competition mechanism, the back-off engines 223-1-223-N only count a corresponding random back-off time in response to the $1^{st}$ packet transmission determined to be performed within the duration of the OBSS-TXOP.

In other words, in embodiments of the present invention, the first competition mechanism may cause the backoff engines 223-1-233-N to re-compete for the opportunity of packet transmission before each packet transmission. As a result, the packets transmitted within the duration of the OBSS-TXOP (e.g., the first packet and the second packet) are packets temporarily stored by different queues. The second competition mechanism may only cause the backoff engines 223-1-233-N to compete for the opportunity of packet transmission before the $1^{st}$ packet transmission, and the queue corresponding to the back-off engine that successfully competes for the opportunity of packet transmission will keep providing subsequent packets after the transmission of the $1^{st}$ packet transmission is completed. As a result, the packets transmitted within the duration of the OBSS-TXOP (e.g., the first packet and the second packet) are packets temporarily stored by the same queue.

Figure 4:
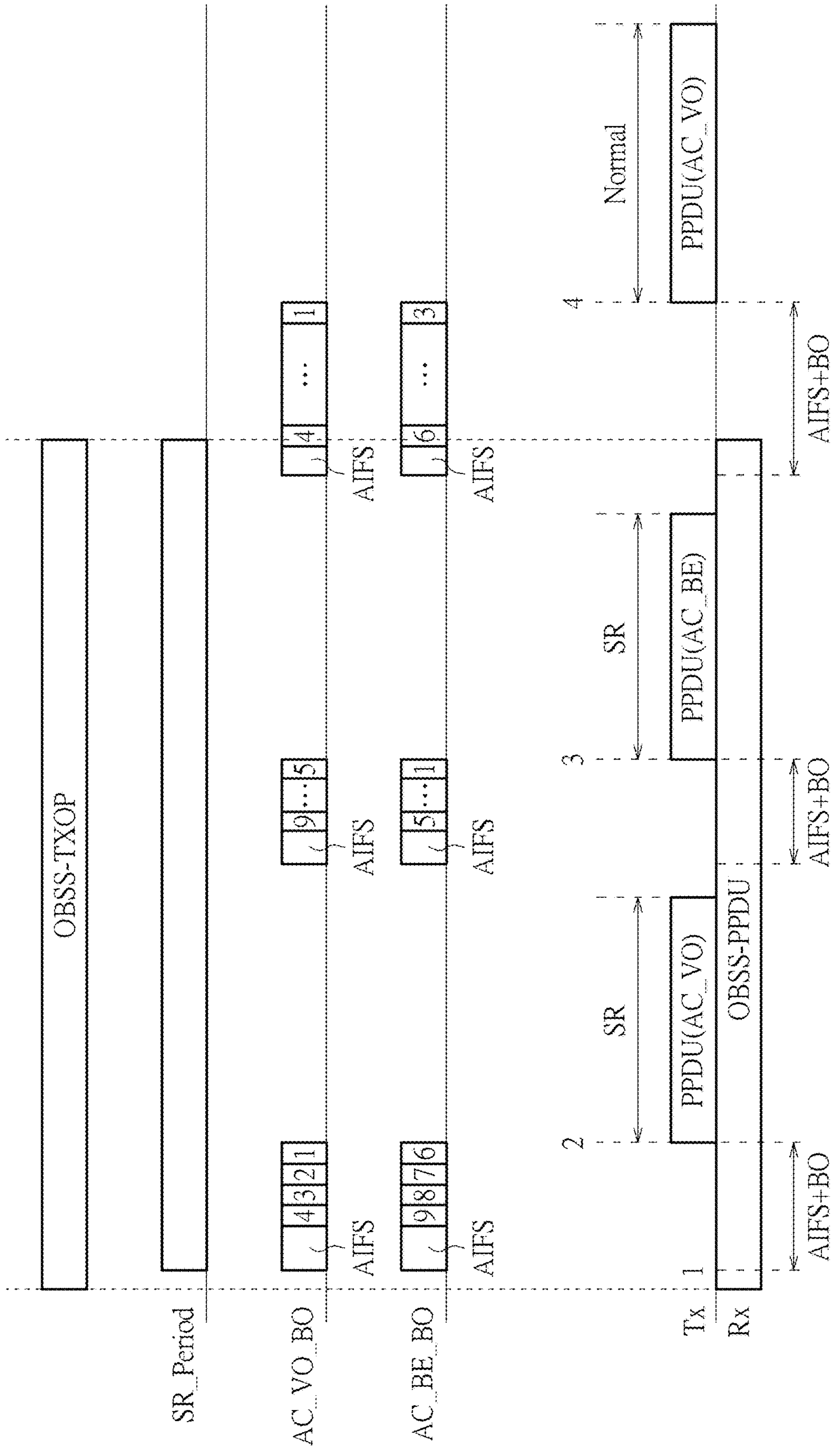
FIG. 4 is a timing diagram of packet transmission of a first competitive mechanism according to an embodiment of the present invention.

FIG. 4 is a timing diagram of packet transmission of the first competitive mechanism according to an embodiment of the present invention, wherein the bottom half of FIG. 4 shows transmission operations Tx and reception operations Rx performed by the communication device 100. According to the reception operations Rx of the communication device 100, the communication device 100 receives packets from an OBSS (e.g., physical layer protocol data unit (PPDU) OBSS-PPDU shown in FIG. 4). In addition, the symbol "OBSS-TXOP" shown in FIG. 4 represents the TXOP corresponding to the packets from the OBSS (e.g., OBSS-PPDU) received by the communication device 100. The symbol "SR Period" shown in FIG. 4 represents the value of the parameter SR Period stored in the memory unit 230. In addition, the symbols "AC_VO_BO" and "AC_BE BO" shown in FIG. 4 represent countdown operations performed by backoff engines corresponding to the access categories AC_VO and AC_BE, respectively, which count corresponding random backoff times in a countdown manner.

As mentioned above, when determining that the received packet is from an OBSS, the decision unit 210 may set the value of the parameter SR Period stored in the memory unit 230 as the first value (e.g., a bit value with a high level shown in FIG. 4) within the duration of the OBSS-TXOP, such that the decision unit 210 and the transmit packet scheduling unit 220 may determine whether it is still within the duration of the OBSS-TXOP according to the value of the parameter SR_Period.

In embodiments of the present invention, the decision unit 210 may determine to perform the packet transmission in the spatial reuse manner within the duration of the OBSS-TXOP. As a result, the transmit packet scheduling unit 220 may start to schedule the transmission of the packets, and the response unit 221 may notify the back-off engine corresponding to the queue temporarily storing the packets to be transmitted to start the countdown operation, in order to count the corresponding random back-off time and compete for channel for transmission. In general, each back-off engine may first count a corresponding arbitration inter-frame space (AIFS), and then count the corresponding random back-off time (e.g., the 1$^{st}$ countdown operation "4, 3, 2, 1" performed by the back-off engine corresponding to the access category AC_VO, and the 1$^{st}$ countdown operation "9, 8, 7, 6" performed by the back-off engine corresponding to the access category AC_BE shown in FIG. 4). In FIG. 4, the countdown operations performed by the communication device 100 are labeled as "AIFS+BO".

According to an embodiment of the present invention, when the selected competition mechanism is the first competition mechanism, the back-off engine corresponding to the queue temporarily storing the packets to be transmitted may perform the corresponding countdown operation in response to each packet transmission determined to be performed within the duration of the OBSS-TXOP. As a result, in the examples shown in FIG. 4, at least two countdown operations are performed within the duration of the OBSS-TXOP.

In this example, the 1$^{st}$ countdown operation is started from a time point "1", and is first completed by the back-off engine corresponding to the access category AC_VO. As a result, at a time point "2", the communication device 100 transmits the packets temporarily stored in the queue of the access category AC_VO (e.g., a packet PPDU (AC_VO) of the access category AC_VO shown in FIG. 4) in the spatial reuse manner (labeled as "SR" in FIG. 4). It should be noted that, before the packet PPDU (AC_VO) of the access category AC_VO is actually transmitted, the response unit 221 may confirm the value of the parameter SR_Period again to determine whether it is currently still within the duration of the OBSS-TXOP. If Yes, the packet PPDU (AC_VO) is transmitted.

After the transmission of the packet PPDU (AC_VO) is completed, the response unit 221 may confirm the value of the parameter SR_Period again to determine whether it is currently still within the duration of the OBSS-TXOP. If Yes, the 2$^{nd}$ countdown operation starts to be performed. Assume that the 2$^{nd}$ countdown operation is first completed by the back-off engine corresponding to the access category AC_BE. At a time point "3", the communication device 100 transmits packets temporarily stored in the queue of the access category AC_BE (e.g., a packet PPDU (AC_BE) of the access category AC_BE shown in FIG. 4) in the spatial reuse manner. Similarly, before the packet PPDU (AC_BE) of the access category AC_BE is actually transmitted, the response unit 221 may confirm the value of the parameter SR_Period again to determine whether it is currently still within the duration of the OBSS-TXOP. If Yes, the packet PPDU (AC_BE) is transmitted.

On the other hand, if it is determined that the duration of the OBSS-TXOP has ended, and the current countdown operation is first completed by the back-off engine corresponding to the access category AC_VO, the communication device 100 will transmit packets temporarily stored in the queue of the access category AC_VO (e.g., the rightmost packet PPDU (AC_VO) shown in FIG. 4) in the general manner at a time point "4". In addition, in an embodiment of the present invention, a transmission power of a packet transmitted in the general manner is different from that of a packet transmitted in the spatial reuse manner.

Figure 5:
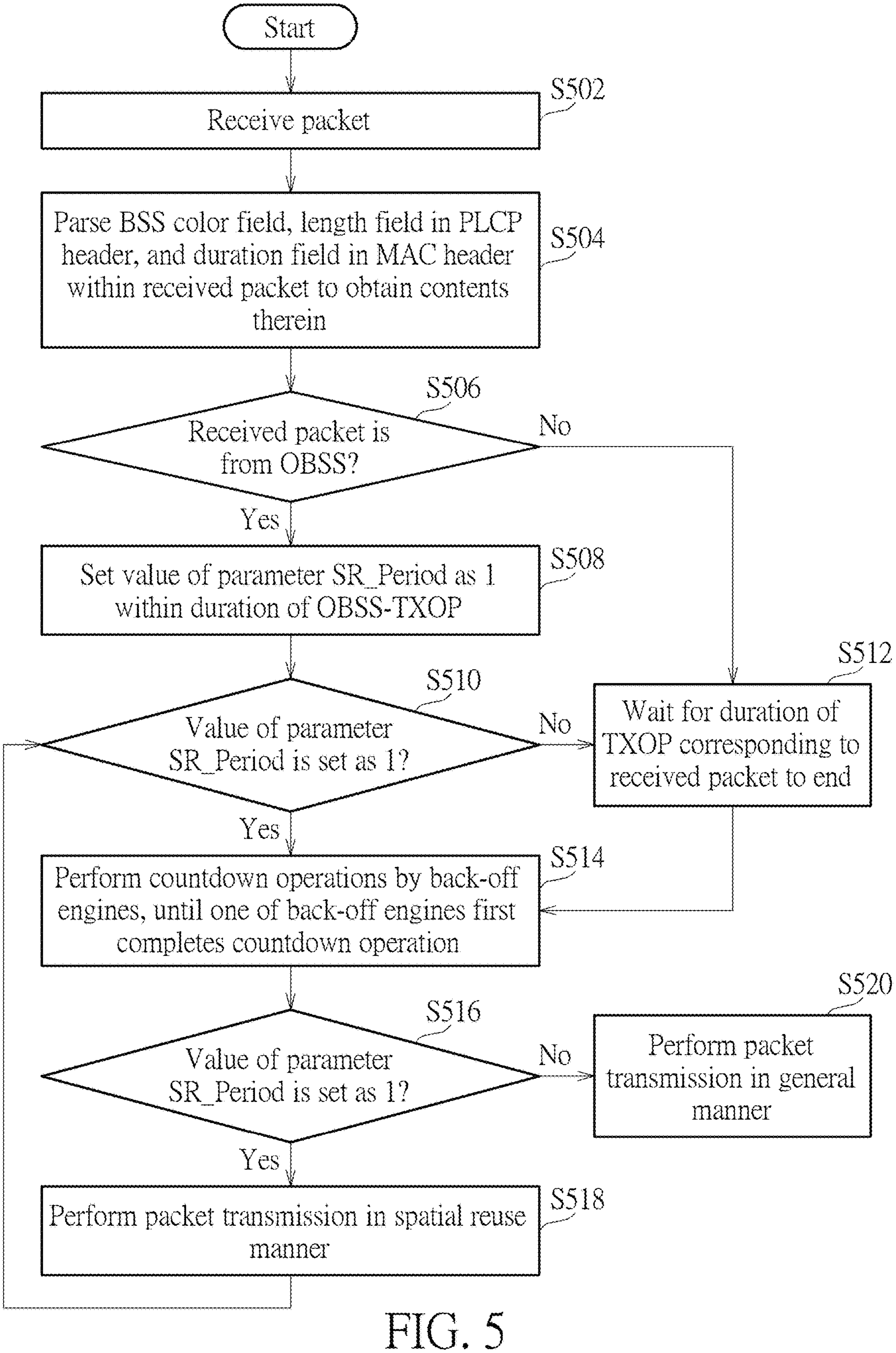
FIG. 5 is a flow chart of a transmission method of the first competitive mechanism according to an embodiment of the present invention.

FIG. 5 is a flow chart of a transmission method of the first competitive mechanism according to an embodiment of the present invention. The transmission throughput of the communication device 100 may be increased by performing the transmission method, and the transmission method may include the following steps executed by the communication device 100 (more particularly, the baseband signal processing circuits 130/200 therein).

In Step S502, a packet is received.

In Step S504, a BSS color field, a length field in a PLCP header, and a duration field in an MAC header within the received packet are parsed to obtain contents therein.

In Step S506, it is determined whether the received packet is from an OBSS. If Yes, Step S508 is entered; if No, Step S512 is entered.

In Step S508, the value of the parameter SR_Period is set as the first value (e.g., the bit value with the high level (which may correspond to the value 1) shown in FIG. 4) within the duration of the TXOP corresponding to the received packet (i.e., the OBSS-TXOP).

In Step S510, it is determined whether the duration of the OBSS-TXOP has not ended according to the value of the parameter SR_Period (e.g., whether the value of the SR_Period is set as 1). If Yes, Step S514 is entered. If No, Step S512 is entered.

In Step S512, the communication device 100 waits for the duration of the TXOP corresponding to the received packet to end.

In Step S514, the countdown operations are performed by the back-off engines, until one of the back-off engines first completes the countdown operation. In embodiments of the present invention, the back-off engine that first completes the countdown operation obtains the packet transmission opportunity, and the response unit 221 may find the packets within the corresponding queue, and perform the packet transmission according to the transmission power recommended by the transmission power control unit 222.

In Step S516, it is determined whether the duration of the OBSS-TXOP has not ended according to the value of the parameter SR_Period (e.g., whether the value of the SR_Period is set as 1). If Yes, Step S518 is entered. If No, Step S520 is entered.

In Step S518, the packet transmission is performed in the spatial reuse manner.

In Step S520, the packet transmission is performed in the general manner.

It should be noted that if one or more queues currently and temporarily store packets to be transmitted, after it is determined that the received packet is from the OBSS, the communication device 100 may keep performing the packet transmission in the spatial reuse manner within the duration of the OBSS-TXOP. If the received packet is not from the OBSS, the communication device 100 must wait for the duration of the TXOP corresponding to the received packet to end, and performs the packet transmission in the general manner after the duration of the TXOP corresponding to the received packet ends. In addition, according to the first competitive mechanism proposed by the present invention, after Step S518 is completed, Step S510 can be returned. If the OBSS-TXOP duration has not yet ended, the packet transmission opportunity can be re-competed in Step S514 according to the first competitive mechanism proposed by the present invention.

Figure 6:
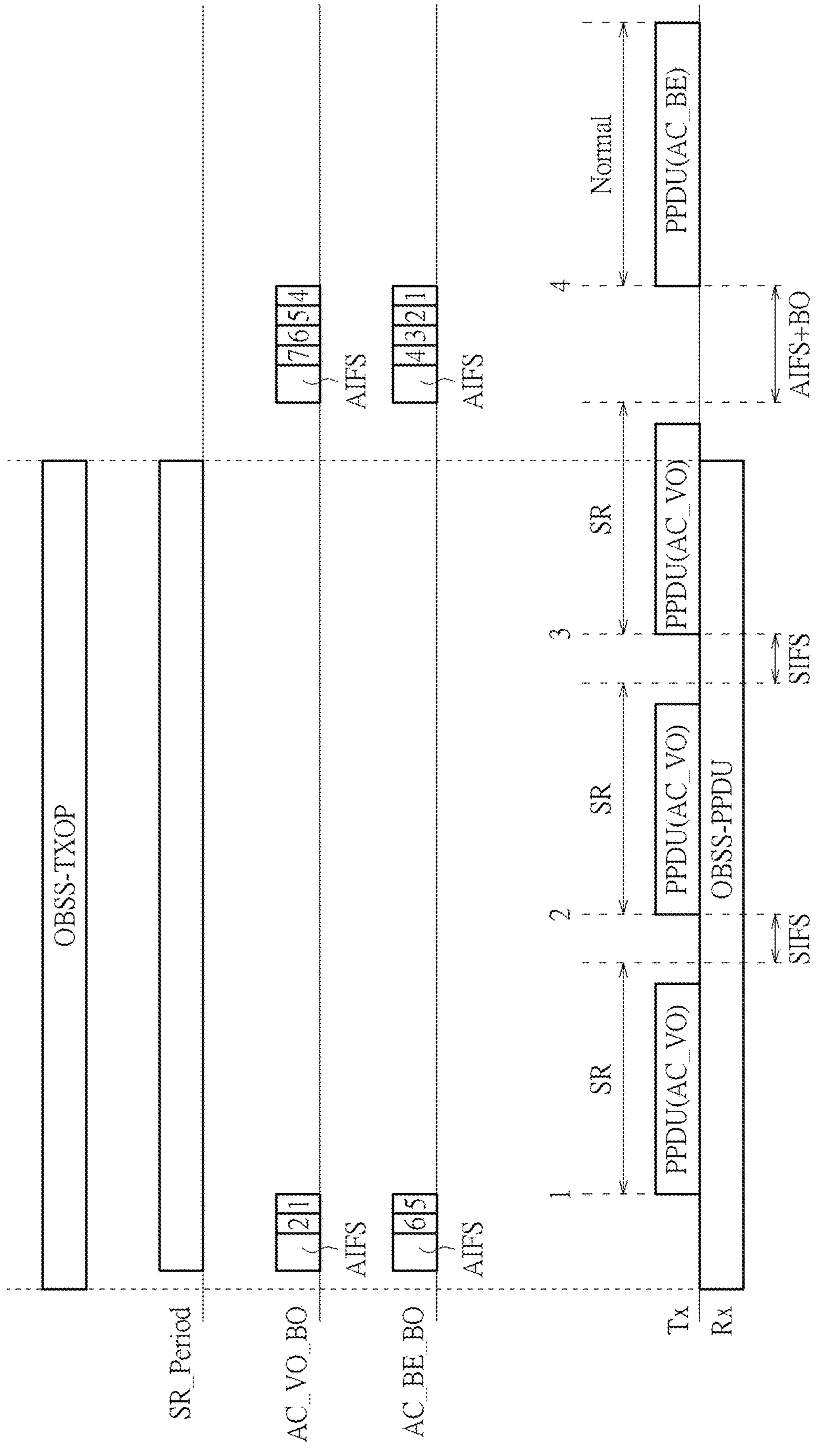
FIG. 6 is a timing diagram of packet transmission of a second competitive mechanism according to an embodiment of the present invention.

FIG. 6 is a timing diagram of packet transmission of the second competitive mechanism according to an embodiment of the present invention, wherein the bottom of FIG. 6 shows transmission operations Tx and reception operations Rx performed by the communication device 100. According to the reception operations Rx of the communication device 100, the communication device 100 receives packets from an OBSS (e.g., OBSS-PPDU shown in FIG. 6). In addition, the symbol "OBSS-TXOP" shown in FIG. 6 represents the TXOP corresponding to the packets from the OBSS (e.g., OBSS-PPDU) received by the communication device 100. The symbol "SR_Period" shown in FIG. 6 represents the value of the parameter SR_Period stored in the memory unit 230. In addition, the symbols "AC_VO_BO" and "AC_BE_BO" shown in FIG. 6 represent countdown operations performed by backoff engines corresponding to the access categories AC_VO and AC_BE, respectively, which count corresponding random backoff times in a countdown manner.

As mentioned above, when determining that the received packet is from an OBSS, the decision unit 210 may set the value of the parameter SR_Period stored in the memory unit 230 as the first value (e.g., a bit value with a high level shown in FIG. 6) within the duration of the OBSS-TXOP, such that the decision unit 210 and the transmit packet scheduling unit 220 may determine whether it is still within the duration of the OBSS-TXOP according to the value of the parameter SR_Period.

In embodiments of the present invention, the decision unit 210 may determine to perform the packet transmission in the spatial reuse manner within the duration of the OBSS-TXOP. As a result, the transmit packet scheduling unit 220 may start to schedule the transmission of the packets, and the response unit 221 may notify the back-off engine corresponding to the queue temporarily storing the packets to be transmitted to start the countdown operation, in order to count the corresponding random back-off time and compete for channel for transmission.

When the selected competitive mechanism is the second competitive mechanism, the back-off engine corresponding to the queue temporarily storing the packets to be transmitted only perform the countdown operation in response to the $1^{st}$ packet transmission determined to be performed within the duration of the OBSS-TXOP. As a result, in the example shown in FIG. 6, only one countdown operation is performed within the duration of the OBSS-TXOP.

In this example, the $1^{st}$ countdown operation is first completed by the back-off engine corresponding to the access category AC_VO. As a result, at a time point "1", the communication device 100 transmits the packets temporarily stored in the queue of the access category AC_VO (e.g., a packet PPDU (AC_VO) of the access category AC_VO shown in FIG. 6) in the spatial reuse manner (labeled as "SR" in FIG. 6). It should be noted that, before the packet PPDU (AC_VO) of the access category AC_VO is actually transmitted, the response unit 221 may confirm the value of the parameter SR_Period again to determine whether it is currently still within the duration of the OBSS-TXOP. If Yes, the packet PPDU (AC_VO) is transmitted.

After the transmission of the $1^{st}$ packet PPDU (AC_VO) is completed, the response unit 221 may confirm the value of the parameter SR_Period again to determine whether it is currently still within the duration of the OBSS-TXOP. If Yes, after waiting for a short interframe space (SIFS), the communication device 100 may continue to transmit the packets (if any) temporarily stored in the queue of the access category AC_VO (e.g., the $2^{nd}$ packet PPDU (AC_VO) shown in FIG. 6) in the spatial reuse manner at a time point "2".

Similarly, after the transmission of the $2^{nd}$ packet PPDU (AC_VO) is completed, the response unit 221 may confirm the value of the parameter SR_Period again to determine whether it is currently still within the duration of the OBSS-TXOP. If Yes, after waiting for the SIFS, the communication device 100 may continue to transmit the packets (if any) temporarily stored in the queue of the access category AC_VO (e.g., the $3^{rd}$ packet PPDU (AC_VO) shown in FIG. 6) in the spatial reuse manner at a time point "3".

After the transmission of the $3^{rd}$ packet PPDU (AC_VO) is completed, the response unit 221 may confirm the value of the parameter SR_Period again to determine whether it is currently still within the duration of the OBSS-TXOP. If it is determined that the duration of the OBSS-TXOP has ended, the response unit 221 may notify the back-off engine corresponding to the queue temporarily storing the packets to be transmitted to start to perform the countdown operation, in order to count the corresponding random back-off time and re-compete for channel for transmission. In this example, the countdown operation after the duration of the OBSS-TXOP ends is first completed by the back-off engine corresponding to the access category AC_BE. As a result, at a time point "4", the communication device 100 may transmit the packets temporarily stored in the queue of the access category AC_BE (e.g., the rightmost packet PPDU (AC_BE) shown in FIG. 6) in the general manner. In an embodiment of the present invention, a transmission power of a packet transmitted in the general manner is different from that of a packet transmitted in the spatial reuse manner.

Figure 7:
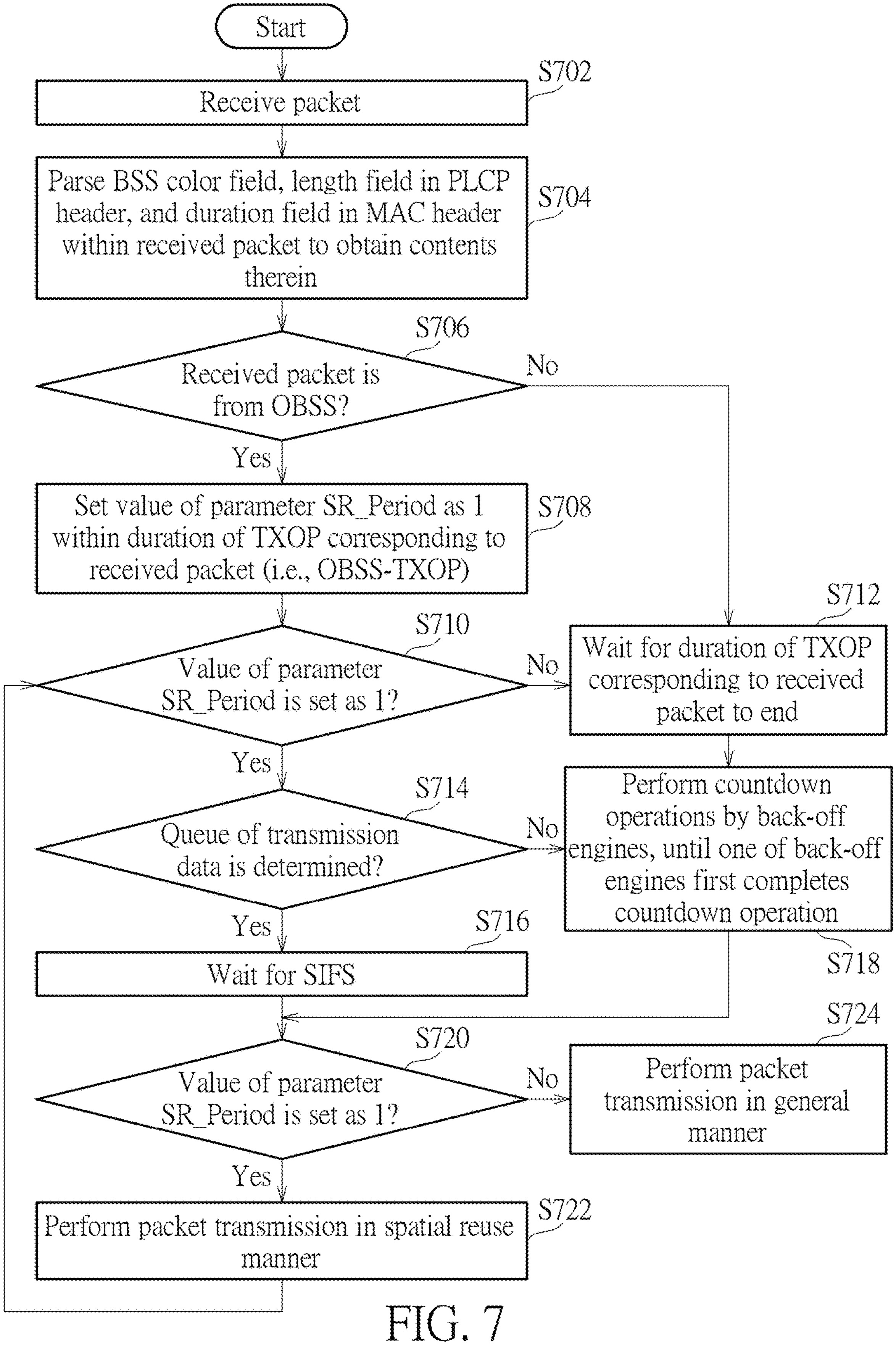
FIG. 7 is a flow chart of a transmission method of the second competitive mechanism according to an embodiment of the present invention.

FIG. 7 is a flow chart of a transmission method of the second competitive mechanism according to an embodiment of the present invention. The transmission throughput of the communication device 100 may be increased by performing the transmission method, and the transmission method may include the following steps executed by the communication device 100 (more particularly, the baseband signal processing circuits 130/200 therein).

In Step S702, a packet is received.

In Step S704, a BSS color field, a length field in a PLCP header, and a duration field in an MAC header within the received packet are parsed to obtain contents therein.

In Step S706, it is determined whether the received packet is from an OBSS. If Yes, Step S708 is entered; if No, Step S712 is entered.

In Step S708, the value of the parameter SR_Period is set as the first value (e.g., the bit value with the high level shown in FIG. 6) within the duration of the TXOP corresponding to the received packet (i.e., the OBSS-TXOP).

In Step S710, it is determined whether the duration of the OBSS-TXOP has not ended according to the value of the parameter SR_Period (e.g., whether the value of the SR_Period is set as 1). If Yes, Step S714 is entered. If No, Step S712 is entered.

In Step S712, the communication device 100 waits for the duration of the TXOP corresponding to the received packet to end.

In Step S714, it is determined whether the queue of the transmission data has been determined. If Yes, Step S716 is entered. If No, Step S718 is entered.

In Step S716, the communication device 100 waits for the SIFS.

In Step S718, the countdown operations are performed by the back-off engines, until one of the back-off engines first completes the countdown operation. In embodiments of the present invention, the back-off engine that first completes the countdown operation obtains the packet transmission opportunity within the entire duration of the OBSS-TXOP, and the response unit 221 may find the packets within the corresponding queue, and perform the packet transmission according to the transmission power recommended by the transmission power control unit 222.

In Step S720, it is determined whether the duration of the OBSS-TXOP has not ended according to the value of the parameter SR_Period (e.g., whether the value of the SR_Period is set as 1). If Yes, Step S722 is entered. If No, Step S724 is entered.

In Step S722, the packet transmission is performed in the spatial reuse manner.

In Step S724, the packet transmission is performed in the general manner.

It should be noted that if one or more queues currently and temporarily store packets to be transmitted, after it is determined that the received packet is from the OBSS and the back-off engine corresponding to one of the one or more queues has competed for the packet transmission opportunity, the communication device 100 may directly transmit the packets temporarily stored in this queue in sequence in the spatial reuse manner within the duration of the OBSS-TXOP. If the received packet is not from the OBSS, the communication device 100 must wait for the duration of the TXOP corresponding to the received packet to end, and performs the packet transmission in the general manner after the duration of the TXOP corresponding to the received packet ends.

In addition, it should be noted that, according to the second competitive mechanism proposed by the present invention, after Step S722 is completed, Step S710 can be returned. If it is determined that it is still within the duration of the OBSS-TXOP, since the determination result of Step S714 is "Yes" at this moment, the back-off engine has no need to re-compete for the packet transmission opportunity, and may continue to transmit packets temporarily stored in the same queue after waiting for the SIFS (Step S716).

In embodiments of the present invention, by setting the value of the parameter SR_Period according to information of the duration of the OBSS-TXOP, the value of the parameter SR_Period may indicate a state of a spatial reuse duration. For example, if the value of the parameter SR_Period is set as 1, it represents that it is still within the spatial reuse duration (i.e., the duration of the OBSS-TXOP has not ended). On the other hand, if the value of the parameter SR_Period is set as 0, it represents that it is currently not within the spatial reuse duration (i.e., the duration of the OBSS-TXOP has ended). The transmit packet scheduling unit may flexibly arrange the packet transmission according to this information (e.g., arrange to perform the packet transmission in the spatial reuse manner according to a competition result of the first competition mechanism and the second competition mechanism), and may transmit multiple packets in the spatial reuse manner within the duration of the OBSS-TXOP. In this way, the transmission throughput can be increased and the delay can be reduced, which can greatly improve the user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:

a wireless transceiver circuit, arranged to transmit and receive a wireless signal, wherein the wireless signal comprises a received packet; and a baseband signal processing circuit, coupled to the wireless transceiver circuit, and arranged to process the received packet;

wherein the baseband signal processing circuit comprises:

a decision unit, arranged to determine whether the received packet is from an overlapping basic service set (OBSS), and determine a length of a duration of a transmission opportunity (TXOP) according to information carried by the received packet; and a transmit packet scheduling unit, arranged to schedule transmission of a plurality of packets;

wherein when the decision unit determines that the received packet is from the OBSS, the transmit packet scheduling unit arranges to transmit a first packet among the plurality of packets, and further determines whether the duration of the TXOP has not ended after transmission of the first packet is completed; and in response to the transmit packet scheduling unit determining that the duration of the TXOP has not ended, the packet transmission scheduling unit arranges to transmit a second packet among the plurality of packets within the duration of the TXOP;

wherein the transmission of the first packet and transmission of the second packet are arranged according to a selected competitive mechanism;

when the selected competitive mechanism is a first competitive mechanism, a corresponding random back-off time is counted in response to each packet transmission determined to be performed within the duration of the TXOP; and when the selected competitive mechanism is a second competitive mechanism, a corresponding random back-off time is only counted in response to a first packet transmission determined to be performed within the duration of the TXOP.

2. The communication device of claim 1, wherein in response to the transmit packet scheduling unit determining that the duration of the TXOP has ended, the transmit packet scheduling unit arranges to transmit a third packet among the plurality of packets, wherein a transmission power of the third packet is different from a transmission power of the first packet and a transmission power of the second packet.

3. The communication device of claim 1, wherein the baseband signal processing circuit further comprises:

a memory unit, arranged to store a parameter, wherein the decision unit sets a value of the parameter to indicate a state of a spatial reuse duration; and the transmit packet scheduling unit comprises:

a plurality of queues, wherein each of the plurality of queues is arranged to temporarily store a portion of the plurality of packets;

a plurality of back-off engines, wherein each of the plurality of back-off engines corresponds to one of the plurality of queues, and is arranged to count a random back-off time; and a response unit, arranged to arrange the transmission of the first packet and transmission of the second packet according to the selected competitive mechanism, and determine whether the duration of the TXOP has not ended according to the value of the parameter stored by the memory unit.

4. The communication device of claim 3, wherein the baseband signal processing circuit further comprises:

a timer, wherein the decision unit sets the timer according to the length of the duration of the TXOP, and changes the value of the parameter stored by the memory unit when the timer expires.

5. The communication device of claim 3, wherein when the response unit determines the duration of the TXOP has not ended, the response unit determines to perform transmission of the plurality of packets in a spatial reuse manner.

6. The communication device of claim 3, wherein when the selected competitive mechanism is the second competitive mechanism, the first packet and the second packet are packets temporarily stored by a same queue, and the same queue is a queue corresponding to a back-off engine that first completes counting of the random back-off time among the plurality of back-off engines.

7. A communication device, comprising:

a wireless transceiver circuit, arranged to transmit and receive a wireless signal, wherein the wireless signal comprises a received packet; and a baseband signal processing circuit, coupled to the wireless transceiver circuit, and arranged to process the received packet, determine whether the received packet is from an overlapping basic service set (OBSS), and determine a length of a duration of a transmission opportunity (TXOP) according to information carried by the received packet;

wherein when the received packet is from the OBSS, the baseband signal processing circuit performs packet transmission in a spatial reuse manner within the duration of the TXOP, and performs the packet transmission in a general manner after the duration of the TXOP ends;

wherein a transmission power utilized in the spatial reuse manner is different from a transmission power utilized in the general manner, and the baseband signal processing circuit transmits a plurality of packets in the spatial reuse manner within the duration of the TXOP;

wherein the transmission of the plurality of packets is arranged according to a selected competitive mechanism; when the selected competitive mechanism is a first competitive mechanism, a corresponding random back-off time is counted in response to each packet transmission determined to be performed within the duration of the TXOP; and when the selected competitive mechanism is a second competitive mechanism, a corresponding random back-off time is only counted in response to a first packet transmission determined to be performed within the duration of the TXOP.

8. The communication device of claim 7, wherein the baseband signal processing circuit comprises:

a decision unit, arranged to determine whether the received packet is from the OBSS, and determine the length of the duration of the TXOP; and a transmit packet scheduling unit, arranged to schedule transmission of the plurality of packets;

wherein the transmit packet scheduling unit arranges to transmit a first packet among the plurality of packets in the spatial reuse manner within the duration of the TXOP, and further determines whether the duration of the TXOP has not ended after transmission of the first packet is completed; and in response to the transmit packet scheduling unit determining that the duration of the TXOP has not ended, the transmit packet scheduling unit arranges to transmit a second packet among the plurality of packets in the spatial reuse manner within the duration of the TXOP.

9. The communication device of claim 8, wherein in response to the transmit packet scheduling unit determining that the duration of the TXOP has ended, the transmit packet scheduling unit arranges to transmit a third packet among the plurality of packets in the general manner.

10. The communication device of claim 8, wherein the baseband signal processing circuit further comprises:

a memory unit, arranged to store a parameter, wherein the decision unit sets a value of the parameter to indicate a state of a spatial reuse duration; and the transmit packet scheduling unit comprises:

a plurality of queues, wherein each of the plurality of queues is arranged to temporarily store a portion of the plurality of packets;

a plurality of back-off engines, wherein each of the plurality of back-off engines corresponds to one of the plurality of queues, and is arranged to count a random back-off time; and a response unit, arranged to arrange the transmission of the first packet and transmission of the second packet according to the selected competitive mechanism, and determine whether the duration of the TXOP has not ended according to the value of the parameter stored by the memory unit.

11. The communication device of claim 10, wherein the baseband signal processing circuit further comprises:

a timer, wherein the decision unit sets the timer according to the length of the duration of the TXOP, and changes the value of the parameter stored by the memory unit when the timer expires.

12. The communication device of claim 10, wherein when the response unit determines the duration of the TXOP has not ended, the response unit determines to perform the transmission of the plurality of packets in the spatial reuse manner.

13. The communication device of claim 10, wherein when the selected competitive mechanism is the second competitive mechanism, the first packet and the second packet are packets temporarily stored by a same queue, and the same queue is a queue corresponding to a back-off engine that first completes counting of the random back-off time among the plurality of back-off engines.

14. A transmission method for increasing a transmission throughput of a communication device, comprising:

receiving a wireless signal, wherein the wireless signal comprises a received packet;

determining whether the received packet is from an overlapping basic service set (OBSS), and determining a length of a duration of a transmission opportunity (TXOP) according to information carried by the received packet;

in response to the received packet being from the OBSS, performing packet transmission in a spatial reuse manner within the duration of the TXOP; and performing the packet transmission in a general manner after the duration of the TXOP ends;

wherein a transmission power utilized in the spatial reuse manner is different from a transmission power utilized in the general manner, and a plurality of packets are transmitted in the spatial reuse manner within the duration of the TXOP;

wherein the transmission of the plurality of packets is arranged according to a selected competitive mechanism; when the selected competitive mechanism is a first competitive mechanism, a plurality of back-off engines of the communication device count a corresponding random back-off time in response to each packet transmission determined to be performed within the duration of the TXOP; and when the selected competitive mechanism is a second competitive mechanism, the plurality of back-off engines only count a corresponding random back-off time in response to a first packet transmission determined to be performed within the duration of the TXOP.

15. The transmission method of claim 14, wherein the step of performing the packet transmission in the spatial reuse manner within the duration of the TXOP further comprises:

arranging to transmit a first packet among the plurality of packets;

determining whether the duration of the TXOP has not ended after transmission of the first packet is completed; and in response to the duration of the TXOP not ending, arranging to transmit a second packet among the plurality of packets in the spatial reuse manner within the duration of the TXOP.

16. The transmission method of claim 15, wherein the step of performing the packet transmission in the general manner after the duration of the TXOP ends further comprises:

arranging to transmit a third packet among the plurality of packets in the general manner.

17. The transmission method of claim 15, wherein when the selected competitive mechanism is the second competitive mechanism, the first packet and the second packet are packets temporarily stored by a same queue, and the same queue is a queue corresponding to a back-off engine that first completes counting of a random back-off time among the plurality of back-off engines.

* * * * *